(12) United States Patent
Alcorn et al.

(10) Patent No.: US 8,589,444 B2
(45) Date of Patent: Nov. 19, 2013

(54) PRESENTING INFORMATION FROM HETEROGENEOUS AND DISTRIBUTED DATA SOURCES WITH REAL TIME UPDATES

(75) Inventors: John W. Alcorn, Youngsville, NC (US); Francisco P. Curbera, Hawthorne, NY (US); Paul T. Keyser, New York, NY (US); Geetika T. Lakskhmanan, Winchester, MA (US); Aleksander Slominski, Riverdale, NY (US)

(73) Assignee: International Business Machines Corporation, Armonk, NY (US)

( * ) Notice: Subject to any disclaimer, the term of this patent is extended or adjusted under 35 U.S.C. 154(b) by 55 days.

(21) Appl. No.: 13/416,178

(22) Filed: Mar. 9, 2012

(65) Prior Publication Data

US 2013/0086125 A1    Apr. 4, 2013

Related U.S. Application Data (63) Continuation of application No. 13/248,295, filed on Sep. 29, 2011, now Pat. No. 8,423,575.

(51) Int. Cl.
   *G06F 17/30*    (2006.01)
(52) U.S. Cl.
   USPC ............ 707/791; 707/802; 707/822; 707/828
(58) Field of Classification Search
   USPC .................................................. 707/600–899
   See application file for complete search history.

(56) References Cited

U.S. PATENT DOCUMENTS

| | | | |
|---|---|---|---|
| 6,138,121 A | 10/2000 | Costa et al. | |
| 6,236,994 B1 | 5/2001 | Swartz et al. | |
| 6,604,114 B1 | 8/2003 | Toong et al. | |
| 7,039,953 B2 | 5/2006 | Black et al. | |
| 7,200,563 B1 | 4/2007 | Hammitt et al. | |
| 7,444,342 B1 | 10/2008 | Hall et al. | |
| 7,630,956 B2 | 12/2009 | Wyatt et al. | |
| 7,889,666 B1 | 2/2011 | Pei et al. | |
| 8,131,838 B2 * | 3/2012 | Bornhoevd et al. | 709/224 |
| 2002/0165745 A1 | 11/2002 | Greene et al. | |
| 2003/0120528 A1 | 6/2003 | Kruk et al. | |
| 2003/0144868 A1 | 7/2003 | MacIntyre et al. | |
| 2004/0107124 A1 | 6/2004 | Sharpe et al. | |
| 2005/0071207 A1 | 3/2005 | Clark et al. | |
| 2005/0278273 A1 | 12/2005 | Uthe | |

(Continued)

OTHER PUBLICATIONS

"BPM for Compliance to Reduce Risk, Time and Cost," Global 360, Optimizing Business Processes, 12 pgs., 2005.

(Continued)

*Primary Examiner* — Isaac M Woo
(74) *Attorney, Agent, or Firm* — Cuenot, Forsythe & Kim, LLC (57) ABSTRACT

Receiving from each of a plurality of low level monitor models an outbound event comprising information associated with a respective data source. The information received in each of the outbound events can be collected to a global monitoring context in which the information is automatically aggregated. Via a global cube associated with the global monitoring context, the information can be presented in a report. At least one new outbound event can be received. The new outbound event can include updated information associated with at least one of the data sources. Responsive to receiving the new outbound event, the information presented the report can be updated in real time to reflect the updated information.

11 Claims, 5 Drawing Sheets

(56) References Cited

U.S. PATENT DOCUMENTS

| | | |
|---|---|---|
| 2006/0123022 A1 | 6/2006 | Bird |
| 2006/0149589 A1 | 7/2006 | Wager |
| 2006/0184410 A1 | 8/2006 | Ramamurthy et al. |
| 2006/0242180 A1 | 10/2006 | Graf et al. |
| 2006/0253477 A1 | 11/2006 | Maranhao |
| 2006/0277523 A1 | 12/2006 | Horen et al. |
| 2007/0088957 A1 | 4/2007 | Carson |
| 2007/0156478 A1 | 7/2007 | Breene et al. |
| 2007/0266166 A1 | 11/2007 | Cohen et al. |
| 2007/0276711 A1 | 11/2007 | Shiu et al. |
| 2007/0283417 A1 | 12/2007 | Smolen et al. |
| 2007/0288479 A1 | 12/2007 | Howard et al. |
| 2008/0040181 A1 | 2/2008 | Freire et al. |
| 2008/0077530 A1 | 3/2008 | Banas et al. |
| 2008/0082377 A1 | 4/2008 | Kennis et al. |
| 2008/0103749 A1 | 5/2008 | Mead |
| 2008/0103854 A1 | 5/2008 | Adam et al. |
| 2008/0120281 A1 | 5/2008 | Marceau et al. |
| 2008/0126042 A1 | 5/2008 | Kim |
| 2009/0281865 A1 | 11/2009 | Stoitsev |
| 2009/0292818 A1 | 11/2009 | Blount et al. |
| 2010/0037161 A1 | 2/2010 | Stading et al. |
| 2010/0082331 A1 | 4/2010 | Brun et al. |
| 2010/0114627 A1 | 5/2010 | Adler et al. |
| 2010/0114628 A1 | 5/2010 | Adler et al. |
| 2010/0114629 A1 | 5/2010 | Adler et al. |

OTHER PUBLICATIONS

Patel, A.J., "Dijkstra's Algorithm, Introduction" [online] Amit's Game Programming Site, [retrieved Aug. 25, 2011] retrieved from the Internet: <http://theory.stanford.edu/~amitp/GameProgramming/AStarComparison.html#S2>, 8 pgs., 2011.

Freire, J., et al., "Provenance for Computational Tasks: A Survey", IEEE Computing in Science & Engineering, pp. 20-30, vol. 10, No. 3, May/Jun. 2008.

Simmhan, Y.L., et al., "A Survey of Data Provenance in e-Science", SIGMOD Record, pp. 31-36, vol. 34, No. 3, Sep. 2005.

Bose, R., et al., "Lineage Retrieval for Scientific Data Processing: A Survey", ACM Computing Surveys, vol. 37, No. 1, pp. 1-28, Mar. 2005.

Scheer, A-W., et al., "ARIS Architecture and Reference Models for Business Process Management", pp. 366-379, 2000.

Ceri, S., et al., "What You Always Wanted to Know About Datalog (and Never Dared to Ask)", [online] IEEE Transactions on Knowledge and Data Engineering, pp. 146-166, vol. 1, No. 1 [retrieved Aug. 25, 2011] retrieved from the Internet: <http://ieeexplore.ieee.org/xpl/freeabs_all.jsp?arnumber=43410>, 1989.

Moreau, L., et al., "The Open Provenance Model", 35 pgs., Dec. 2007.

Simmhan, Y.L., et al., "A Framework for Collecting Provenance in Data Centric Scientific Workflows", Proc. of the IEEE Int'l Conference on Web Services (ICWS), 8 pgs., Sep. 2006.

"Faceted Search," [online] Wikipedia, The Free Encyclopedia, Sep. 19, 2011, retrieved from the Internet: <http://en.wikipedia.org/wiki/Faceted_search>, 4 pgs.

Ballard, C., et al.; "Multidimensional Analytics: Delivered with InfoSphere Warehouse Cubing Services"; [online] IBM Corporation, Apr. 2009, 256 pgs., <http://www.redbooks.ibm.com/abstracts/sg247679.html>.

Cognos Inc.; "Selecting the Right Enterprise Planning Solution", [online] Cognos, Inc., 17 pgs., Jun. 2005, retrieved from the Internet: <http://www.biinform.com/whitepapers/wp_therightsolution.pdf>.

Chen, Q.; "A Distributed OLAP Infrastructure for E-Commerce"; Fourth IFCIS Conference on Cooperative Information Systems (COOPIS'99); HP Labs, 12 pgs., 1999.

* cited by examiner

Receive a definition of a global monitor model, the definition indicating a plurality of low level monitor models associated with the global monitor model
302

Automatically define a global monitoring context for the global monitor model, the global monitoring context being a summation of low level monitoring contexts associated with the low level monitor models
304

Automatically define a global cube, the global cube configured to incorporate aspects of low level cubes associated with the low level monitoring contexts
306

Receive at least one user input to further configure the global cube
308

```
┌─────────────────────────────────────────────────────────────────────────┐
│ Via each of a plurality of low level monitor models, receive at least one respective │
│ inbound event comprising information associated with the respective data source │
│                                                                     402 │
└─────────────────────────────────────────────────────────────────────────┘
                                    ↓
┌─────────────────────────────────────────────────────────────────────────┐
│ Via each of a plurality of low level monitoring contexts, each of which is associated with │
│ a respective one of the low level monitor models, capture the respective inbound event │
│ and collect the information within the low level monitoring context    │
│                                                                     404 │
└─────────────────────────────────────────────────────────────────────────┘
                                    ↓
┌─────────────────────────────────────────────────────────────────────────┐
│ Responsive to each inbound event, generate a respective one of the outbound events via │
│ a respective one of the low level monitor models, the outbound event comprising │
│ information associated with the respective data source                 │
│                                                                     406 │
└─────────────────────────────────────────────────────────────────────────┘
                                    ↓
┌─────────────────────────────────────────────────────────────────────────┐
│ Via a global monitor model, receive from the outbound events from the respective low │
│ level monitor models                                                   │
│                                                                     408 │
└─────────────────────────────────────────────────────────────────────────┘
                                    ↓
┌─────────────────────────────────────────────────────────────────────────┐
│ Collect the information received in each of the outbound events to a global monitoring │
│ context in which the information is automatically aggregated           │
│                                                                     410 │
└─────────────────────────────────────────────────────────────────────────┘
                                    ↓
┌─────────────────────────────────────────────────────────────────────────┐
│ Via a global cube associated with the global monitoring context, present the information │
│ in a report                                                            │
│                                                                     412 │
└─────────────────────────────────────────────────────────────────────────┘
                                    ↓
┌─────────────────────────────────────────────────────────────────────────┐
│ Receive at least one new outbound event comprising updated information associated │
│ with at least one of the data sources                                  │
│                                                                     414 │
└─────────────────────────────────────────────────────────────────────────┘
                                    ↓
┌─────────────────────────────────────────────────────────────────────────┐
│ Aggregate the information received in the new outbound event to information │
│ collected by the global monitoring context from at least one previous outbound event │
│                                                                     416 │
└─────────────────────────────────────────────────────────────────────────┘
                                    ↓
┌─────────────────────────────────────────────────────────────────────────┐
│ Responsive to receiving the new outbound event, in real time, automatically update the │
│ information presented the report                                       │
│                                                                     418 │
└─────────────────────────────────────────────────────────────────────────┘
```

PRESENTING INFORMATION FROM HETEROGENEOUS AND DISTRIBUTED DATA SOURCES WITH REAL TIME UPDATES

CROSS-REFERENCE TO RELATED APPLICATIONS

This application is a Continuation of U.S. application Ser. No. 13/248,295, filed on Sep. 29, 2011.

BACKGROUND

One or more embodiments disclosed within this specification relate to presenting information from disparate data sources.

Organizations, both small and large, using data processing systems to process large amounts of data, and store this data into relational databases. Oftentimes, different applications are used to generate different types of data. Moreover, different relational databases commonly are used to store the different types of data. When information from the relational databases is to be retrieved, individual reports usually are generated for the data contained in the respective databases. A user then can peruse the various reports to ascertain desired information.

BRIEF SUMMARY

One or more embodiments disclosed within this specification relate to presenting information from a plurality of heterogeneous and distributed data sources data sources. An embodiment can include, via a processor executing a global monitor model, receiving from each of a plurality of low level monitor models an outbound event comprising information associated with a respective data source. The information received in each of the outbound events can be collected, via the processor, to a global monitoring context in which the information is automatically aggregated, wherein the global monitoring context is a data structure that captures events to maintain a shadow image of information collected from the plurality of heterogeneous and distributed data sources. Via a global cube associated with the global monitoring context, the information can be presented in a report. At least one new outbound event can be received. The new outbound event can include updated information associated with at least one of the data sources. Responsive to receiving the new outbound event, the information presented in the report can be updated in real time to reflect the updated information.

Another embodiment can include a method of configuring a system to present information from a plurality of heterogeneous and distributed data sources data sources. The method can include receiving a definition of a global monitor model, the definition indicating a plurality of low level monitor models associated with the global monitor model. A global monitoring context can be automatically defined for the global monitor model, the global monitoring context being a summation of low level monitoring contexts associated with the low level monitor models, wherein the global monitoring context is a data structure that captures events to maintain a shadow image of information collected from the plurality of heterogeneous and distributed data sources. A global cube can be automatically defined. The global cube can be configured to incorporate aspects of low level cubes associated with the low level monitoring contexts.

Another embodiment can include a computer program product. The computer program product can include a computer-readable storage medium having computer-readable program code embodied therewith, the computer-readable program code configured to perform the various steps and/or functions disclosed within this specification.

Another embodiment can include a system. The system can include a computer-readable storage medium having computer-readable program code embodied therewith. The system further can include a processor coupled to the computer-readable storage medium, wherein responsive to executing the computer-readable program code, the processor is configured to perform executable operations as described within this specification.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The present invention relates to presenting information from disparate data sources with real time updates. More particularly, a global monitoring context can be defined to collect information, such as measures and dimensions, from disparate data sources. In illustration, the global monitoring context can collect the information from a plurality of low level monitor models associated with the respective data sources.

A global cube can be defined and associated with the global monitoring context. The global cube can track and aggregate the information collected by the global monitoring context. Within the global cube, a user can define at least one measure and at least one dimension to be tracked. For example, via the global cube, a user can specify that an average order amount for all orders placed within a particular region is to be presented within a report. The report can be updated in real time as information is updated (e.g., entered into, deleted from, or changed in) one or more of the disparate data sources, which can be heterogeneous and distributed in a system (e.g., across a plurality of data tables and/or across a plurality of data bases), or distributed across a plurality of systems. Moreover, the information can be analyzed using multi-dimensional analysis. For example, if the information is categorized based on location, a user can view the information for a particular country, and drill down the information for a particular state, city, zip code, etc. An object, such as a widget, can be presented on a user's client device, for example on a dashboard view, to represent the global monitoring context.

Several definitions that apply throughout this document will now be presented.

As used herein, the term "real time" means a level of processing responsiveness that a user or system senses as sufficiently immediate for a particular process or determination to be made, or that enables the processor to keep up with some external process.

As used herein, the term "data source" means a source of information, such as one or more measures and/or one or more dimensions. A data source can include one or more data tables, or other suitable data structures that store information. The information can relate an entity (real or abstract) being monitored.

As used herein, the term "information" means data stored in a data source. As such, information can include one or more measures and one or more dimensions. A "measure," as used herein, is a fact or a group of facts represented by data within the information. A "dimension," as used herein, is a data category used to categorize measures for reporting or analysis. Some examples of dimensions are time, accounts, products, and markets. Dimensions can comprise of one or more attributes, which may be hierarchical. In illustration, location attributes can include a city, a region, a country, etc. Still, a myriad of other dimensions can be used and the invention is not limited to these specific examples.

A "key," as used herein, is an identifier globally unique across a plurality of data sources. As such, a key can link related information stored in disparate data sources. For example, a key can comprise a value and/or alphanumeric text, and can be stored in within a field of each data table record holding related information. In illustration, a particular key can be stored in each record that pertains to a particular entity. In this regard, the disparate data sources can be distributed across a system, for example across a plurality of data tables and/or across a plurality of databases, or can be distributed across a plurality of systems. Moreover, the disparate data sources can be heterogeneous, meaning that, other than a common key, the data sources can contain heterogeneous information.

The term "monitor model," as used herein, is a data structure that monitors information stored by a data source. A monitor model may monitor all information stored by a data source, or can be defined to monitor a portion of the information. As used herein, the term "global monitor model," is a monitor model that receives events, and thus information, from a plurality of low level monitor models, wherein such information is received by the low level monitor models from a plurality of disparate data sources. For example, when the low level monitor models receive inbound events from the data sources, the low level monitor models can generate new outgoing events to pass at least a portion of the information to the global monitor model. In this regard, the term "low level monitor model," as used herein, is a monitor model that receives an inbound event, and thus information, from a particular data source, and communicates to a global monitor model outgoing an event containing at least a portion of such information. As such, a low level monitor model is lower in a monitor model hierarchy than the global monitor model.

The term "monitoring context," as used herein, is a data structure, such as a data table or the like, associated with a monitor model that captures events to collect information from the events in order to maintain a shadow image of such information. The term "global monitoring context," as used herein, is a monitoring context that captures events to maintain a shadow image of information collected from a plurality of disparate data sources. For example, the information can be captured by the global monitoring context from events triggered by one or more low level monitor models. The term "low level monitoring context," as used herein, is a monitoring context that captures events to maintain a shadow image of information collected from a particular data source. As such, a low level monitoring context is lower in a monitoring context hierarchy than the global monitoring context.

The term "cube," as used herein, is a data structure that tracks information, such as measures and dimensions, collected from a data source by a monitoring context, thereby allowing fast analysis of the data. By way of example, a cube can track information aggregated from all instances of a monitoring context. The term "global cube," as used herein, is a cube that tracks information collected by disparate low level monitoring contexts. In this regard, a global monitoring context can be defined to collect the information collected by the plurality of disparate low level monitoring contexts. Each of the low level monitoring contexts can be tracked by a respective low level cube. Collecting the information via the global monitoring context enables the global cube to track the information associated with the disparate data sources. The term "low level cube," as used herein, is a cube that tracks information from a particular data source, and is lower in a cube hierarchy than the global cube. In this regard, a global cube can be defined to include a plurality of low level cubes.

Figure 1:
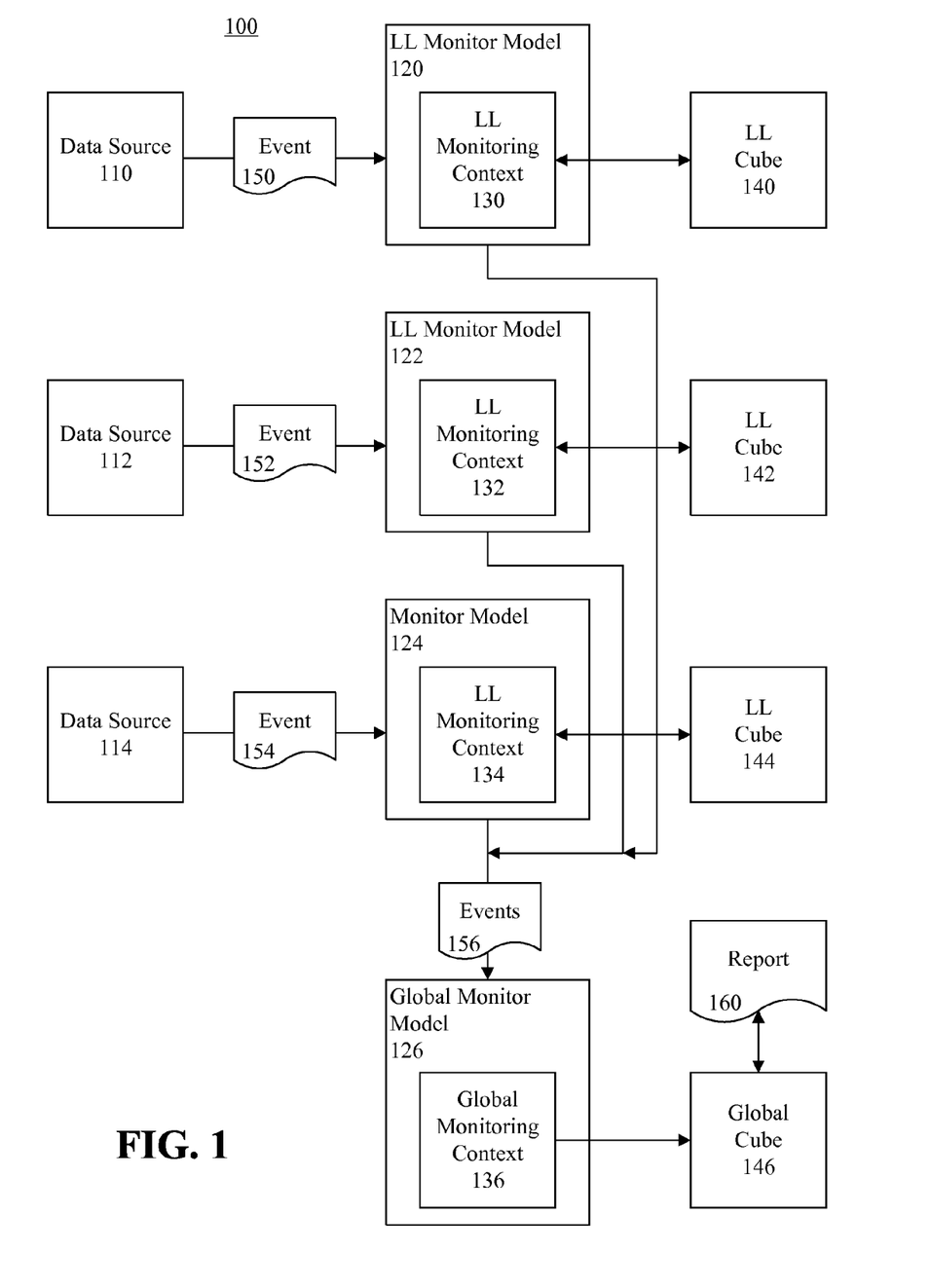
FIG. 1 is a block diagram illustrating a system for implementing multi-dimensional analysis across heterogeneous and distributed data sources in accordance with one embodiment of the present invention.

FIG. 1 is a block diagram illustrating a system 100 for implementing multi-dimensional analysis across heterogeneous and distributed data sources in accordance with one embodiment of the present invention. The system 100 can include a plurality of disparate data sources 110, 112, 116. The data sources 110-114 can be databases, portions of databases, or the like. Information for an entity (real or abstract) being tracked can be stored to the data sources 110-116 in a suitable manner.

The system 100 also can include a plurality of low level monitor models 120, 122, 124, each of which is associated with a respective data source 110-114 and monitors information updated (e.g., stored to, deleted from, or changed in) the respective data source 110-114. In this regard, the low level monitor models 120-124 can define the information to be monitored, and receive the information with inbound events 150, 152, 154 generated by the respective data sources 110-114. The information that is monitored by the low level monitor models 120-124 can be based on a user configuration. For example, a user can select measures and dimensions to be monitored. In this regard, the low level monitor models 120-124 also can describe measures, their dependencies on the inbound events, conditions warranting actions, and outbound events that report these conditions. Inbound and outbound events will be described herein in greater detail.

For each low level monitor model 120-124, at least one respective low level monitoring context 130, 132, 134 can be defined and associated with the monitor model 120-124. Each monitoring context 130-134 can have an associated table into which information collected by the respective monitoring context 130-134 is stored. The tables can be mapped to the respective data sources 110-114. For example, the monitoring context 130 can include records corresponding to records contained in the data source 110, and include at least a portion of the fields contained in the data source 110.

In operation, the monitoring contexts 130-134 can receive information from the respective data sources 110-114, and collect the information to corresponding data tables or other suitable data structures. For example, information from the data source 110 can be collected by the monitoring context 130 and processed to update a corresponding table, information from the data source 112 can be collected by the monitoring context 132 and processed to update a corresponding table, and information from the data source 114 can be collected by the monitoring context 134 and processed to update a corresponding table. In this regard, the information collected by the monitoring context 130 can, other than a defined key field or value, be heterogeneous with respect to information collected by the monitoring context 132 and information collected by the monitoring context 134. Similarly, the information collected by the monitoring context 132 can, other than a defined key field or value, be heterogeneous with respect to information collected by the monitoring context 134.

The table of a monitoring context 130-134 can map the table of the data source 110-114 from which the information is received. Further, a monitoring context 130-134 also can provide a definition that defines all information that should be collected by the monitoring context as a system is running The information can include one or more measures and one or more dimensions. In one embodiment, the measures can be held in metrics, counters, stopwatches, or the like. In this regard, the collected information can be processed to store and/or update measures and dimensions tracked by the monitoring contexts 130-134. Such measures and dimensions can describe the observed state of entity (real or abstract) being tracked.

The low level monitoring contexts 130-134 can capture the inbound events 150-154 communicated from the data sources 110-114 to the respective low level monitor models 120-124 and collect the information from the events. In illustration, the low level monitoring contexts 130-134 can subscribe to the respective events 150-154. When a data source 110-114 is updated, for example to store, delete or update a record in a data table, the data source 114-110 can generate a respective event 150-154, and communicate the event to the respective monitor model 120-124. As such, from the perspective of the low level monitor models 120-124, the events 150-154 can be considered inbound events. The events 150-154 can be generated and communicated to the monitor models 120-124 in real time, and can include the information to be collected.

In one embodiment, an event 150-154 can be a common base event (CBE) generated by a respective data source 110-114 at runtime. As such, the event 150-154 can include an Extensible Markup Language (XML) document containing the information being passed to a respective monitor model 120-124 by the event 150-154. A monitor model 120-124 itself can be an XML document that includes one or more XML Path Language (XPath) expressions used to search through an XML document received with the event 150-154, and extract the information from nodes within the received XML document. The nodes can be any part of the received XML document, such as an element or attribute within the document.

A particular monitoring context 130-134 can collect all of the information extracted by its respective monitor model 120-124, but this need not be the case. In one embodiment, for example, a plurality of monitoring contexts 130-134 can be associated with a monitor model 120-124. For instance, in addition to the monitoring context 130, one or more additional monitoring contexts can be associated with the monitor model 120. The different monitoring contexts can collect different sets of information, though certain information may be common to both sets. By way of a non-limiting example, if the event 150 contains information for eight fields of a record, one monitoring context can collect information contained in six of the fields, and another monitoring context can collect information contained in four of the fields. Information contained in some of the fields may be collected by both monitoring contexts, however.

In one aspect, one or more instances of a monitoring context 130-134 (monitoring context instances) can be executed. Each monitoring context instance can be considered an event-processing agent dedicated to monitoring a particular entity, for example a particular process execution, the state of a particular order, the stock level of an item in a warehouse, etc.

One or more low level cubes 140, 142, 144 can be associated with each of the respective low level monitoring contexts 130-134. For example, the low level cubes 140-144 can be defined atop tables of the respective low level monitoring contexts 130-134. The low level cubes 140-144 can define how the information is collected by the low level monitoring contexts 130-134, and track the information collected by the respective monitoring contexts 130-134. In illustration, the low level cubes 140-144 can be user configurable to define one or more measures and one or more dimensions to be used to categorize the measures. The low level cubes 140-144 also can define certain operations to be performed on the collected information, for example how the information is to be aggregated, summarized, averaged, or the like when the information is presented within a report.

The low level cubes 140-144 further can define the dimensions used to categorize the collected information. Such dimensions can be multi-level dimensions, which enable multi-level analysis of the information. Location information, for example, can include indicators of a country, a state, a city, a zip code, or the like. As such, location information can be considered a multi-level dimension, and processed allow a user to selectively view related measurements grouped by any of these categories. Analytical processing of the data can be performed using relational online analytical processing (ROLAP).

A report can be defined atop each of the low level cubes 140-144. When the report is to be presented to a user, the low level cubes 140-144 retrieve information categorized in a desired manner using structured query language (SQL) statements, or the like, and then output the report for presentation. For instance, the low level cubes 140-144 can output the report to a display, a file, a printer, or the like.

The system further can include a global monitor model 126. The global monitor model 126 can be associated with each of the low level monitor models 120-124, thus forming an association between the global monitor model 126 and the data sources 110-114. Such association can be specified by a user who is defining the global monitor model 126. When such association is established, the low level monitor models 120-124 can be automatically configured to, when the low level monitor models 120-124 receive the events 150-154, generate and communicate outbound events 156 in real time. In this regard, the events 150-154 can trigger the events 156. The outbound events 156 can be CBEs generated by the low level monitor models 120-124 at runtime, but this need not be the case.

The outbound events 156 can include the information contained in the inbound events 150-154, and can be communicated to the global monitor 126. From the perspective of the global monitor 126, the events 156 can be considered to be inbound events. Nonetheless, throughout this specification and the claims that follow, the events 156 will be referred to as "outbound events" so as to distinguish the events 156 from the events 150-154. The global monitor model 126 can describe measures, their dependencies on the events 156, conditions warranting actions, and outbound events that report these conditions.

A global monitoring context 136 can be defined for the global monitor model 126. The global monitoring context 136 can be automatically defined based on the configuration of the global monitor model 126. In illustration, the global monitoring context 136 can be a summation of the low level monitoring contexts 120-124. In other words, the global monitoring context 136 can be a summary monitoring context that rolls up each of the low level monitoring contexts 120-124 into a simple, easily interpreted, view.

The global monitoring context 136 can capture the events 156, collect information contained in the events 156, and automatically aggregate the information into a data table corresponding to the global monitoring context 136. The table of the global monitoring context 136 can map to each of the plurality of data sources 110-114. As such, each field in the data table can correspond to one or more fields contained in data tables of the data sources 110-114. At this point it should be noted that the low level monitoring contexts 120-124 included within the global monitoring context 136 can be previously existing monitoring contexts. For example, the global monitoring context 136 can be defined by a first user, and incorporate low level monitoring contexts 120-124 defined by other users.

The global monitoring context 136 can provide a definition that defines all information that should be collected by the global monitoring context 136 as a system is running Again, the information can include one or more measures and one or more dimensions. In one embodiment, the measures can be held in metrics, counters, stopwatches, or the like. In this regard, the collected information can be processed to store and/or update measures and dimensions tracked by the global monitoring context 136.

The information also can include one or more keys. The global monitoring context 136 can process the keys to create associations between related measures/dimensions which are stored in the disparate data sources 110-114. In illustration, the global monitoring context 136 can process a first event 156 generated by the monitor model 120 in response to an event 150. The first event 156 can include information containing a key related to a particular entity. When another event 156, such as an event 156 generated by the monitor model 122 in response to an event 152, includes information containing that same key, the global monitoring context 136 can, in real time, aggregate such information with the information previously collected from the first event 156. Accordingly, the global monitoring context 136 can aggregate, and monitor, related information stored in the plurality of disparate data sources 110-114. In one embodiment, the user can configure the global monitoring context 126 to identify the fields that provide the key and/or identify one or more specific keys.

In illustration, if data from the data source 110 stores information that includes a claim number, a claim amount and a claim date, and the data source 112 stores information that includes the claim number and a claim type, the claim number can be considered a key. The user can identify the claim number as a key field. Further, the user can specify a specific key, a plurality of keys, or a range of keys, though this need not be the case. Based on the key field and/or user a user specified key or keys, the global monitoring context 136 can collect the claim amount, the claim date and the claim type into a single record. In this example, the claim amount and claim type can be considered measures, and the claim type can be considered a dimension.

One or more global cubes can be associated with the global monitoring context 136. In illustration, a global cube 146 can be defined atop a table associated with the global monitoring context 136 and into which data collected by the global monitoring context 136 is stored. The global cube 146 can define how the information is collected by the global monitoring context 136, and track the information collected by global monitoring context 136. In illustration, the global cube 146 can be user configurable to define one or more measures and one or more dimensions to be used to categorize the measures. The global cube 146 also can define certain operations to be performed on the collected information, for example how the information is to be aggregated, summarized, averaged, or the like when the information is presented within a report 160 defined atop the global cube 146. The global cube 146 further can define the dimensions used to categorize measures within the collected information. Again, such dimensions can be multi-level dimensions, which enable multi-level analysis of the information. Analytical processing of the data can be performed using ROLAP, or another suitable processing technique.

The various configurations can be used to configure the manner in which the information is to be presented in the report 160. As such, the configurations can be referred to as reporting configurations. In one embodiment, the global cube 146 can be automatically configured to incorporate aspects of the low level cubes 140-144. For instance, as noted, when the global monitor model 126 is defined, the user can select the low level monitor models 120-124 to associate with the global monitor model 126. The low level cubes 140-144 associated with the low level monitoring contexts 130-134 can be automatically identified, and corresponding reporting configurations defined within the corresponding low level cubes 140-144 can be incorporated into the global cube 146. User configurable options can be provided to allow the user to configure these reporting configurations, delete one or more of the reporting configurations, and create new reporting configurations within the global cube 146.

The report 160 can present the information collected by the global monitoring context. In one aspect, the information can be summarized. For example, measurements with can be summed, averaged, grouped, etc., for presentation in the report.

When the report is to be presented to a user, the global cube 146 can retrieve information categorized in a desired manner using structured query language (SQL) statements, or the like, and then output the report 160 for presentation. For instance, the global cube 146 can output the report 160 to a display, a file, a printer, or the like. The various reporting configurations of the global cube 146 can allow dimensional analysis to be performed on the measures collected by the global monitoring context 136.

The report 160 can be presented to a user, for example on a display of a client system. The report 160 can be updated in real time as new events 156 are received by the global monitor model 126 and captured by the global monitoring context 136. Accordingly, a user can track changes to the information as such changes occur. In another arrangement, the report 160 can be output, for example stored to a file, printed, or the like.

Figure 2:
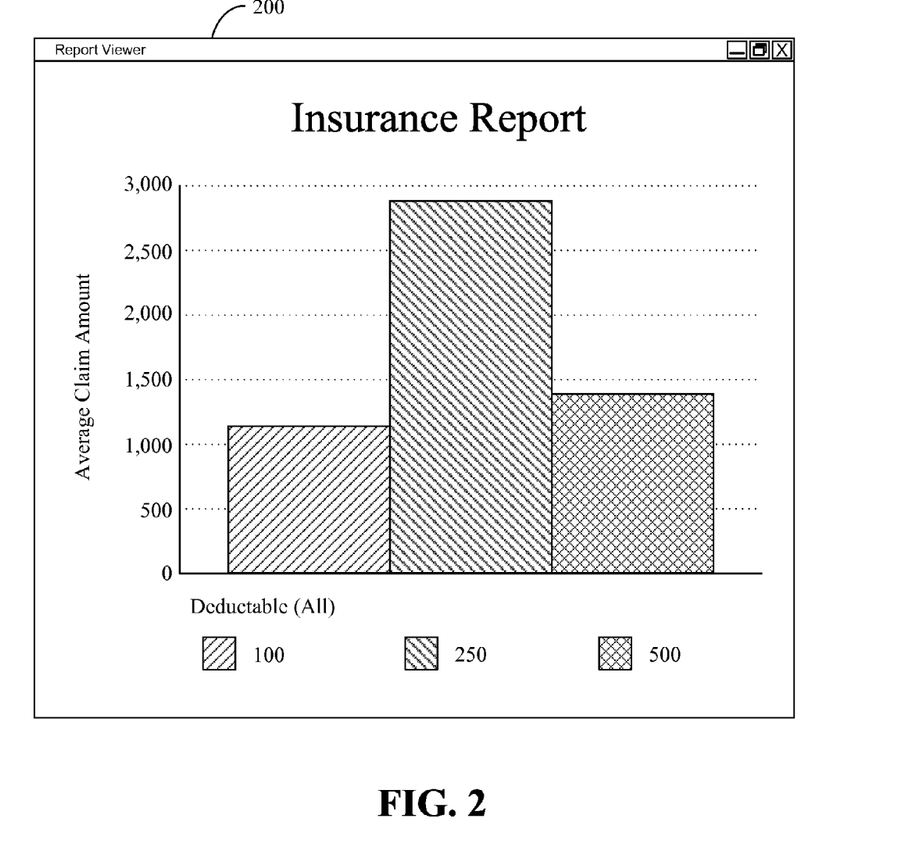
FIG. 2 is an example of a report generated by a method performed in accordance with one embodiment of the present invention.

In one embodiment, an object, such as a widget, can be presented on a display of a user's client device, for example in a dashboard view presented on the display, to represent the global monitoring context 136 in the report 160 in accordance with the global cube 146. The report 160 can present the information in any suitable manner, for example using text, data tables, graphs, charts, etc. An example of a report presented as a chart 200 is depicted in FIG. 2. In the chart 200, the information can be presented in a manner in which measurement information relating to claim amounts is categorized by a dimension "Deductible" and averaged. In this example, the categorized and averaged information is presented as bars on the chart 200.

In this example, a low level monitoring context can monitor a CheckClaimID process, and another low level monitoring context can monitor a ClaimsProcess. A global cube can be generated for a global monitoring context for monitoring this end-to-end insurance process, containing all measures and dimensions from the cubes associated with the low-level monitoring contexts. The low level cubes can be based on metrics that the user chose to propagate to the global monitoring context. For example, if the low level monitoring context for ClaimsProcess has a metric called claimAmount, a corresponding cube measure that computes the average for that metric, the low level monitoring context for CheckClaimID has a metric called deductible, a corresponding cube dimension for that metric, and the user chose to propagate both claimAmount and deductible to the global monitoring context, then the global cube can contain the average claimAmount measure and the deductible dimension. This allows the user to have a report, as shown in FIG. 2, where the user can drill down on the claimAmount to see its average for a given value of the deductible.

In addition, one or more other widgets relating to the global monitoring context 136 also can be presented on the user's client device. For example, a diagram widget can be presented showing metrics contained in the global monitoring context 136. A widget that depicts instances of information received in the events 156 also can be presented. Still, any other widgets can be presented and the invention is not limited in this regard.

Figure 3:
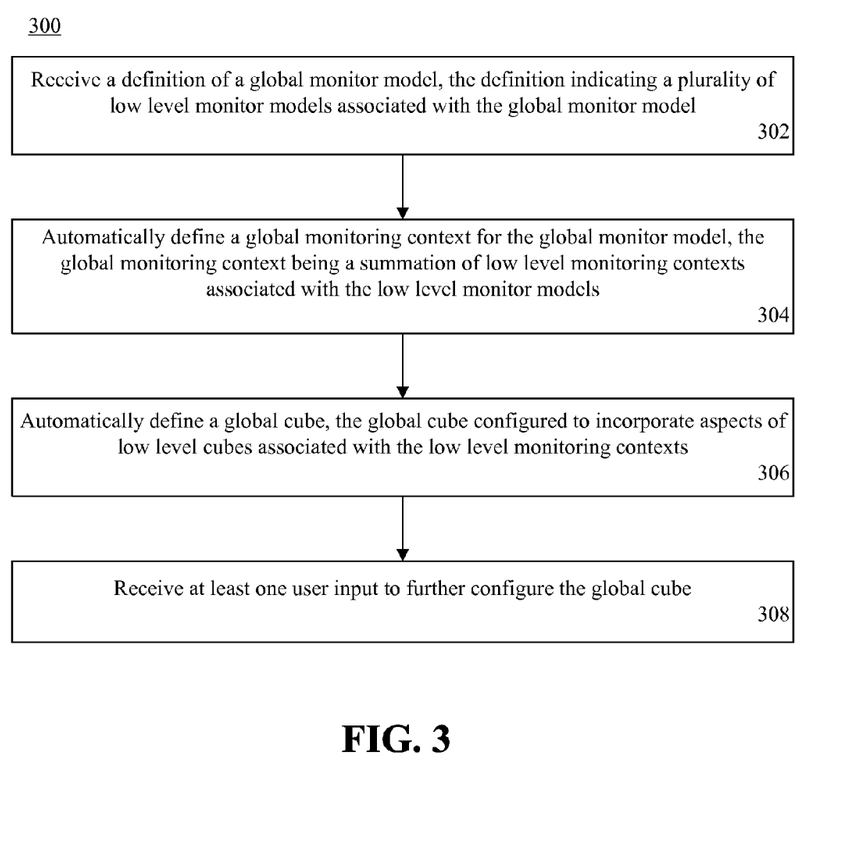
FIG. 3 is a flow chart illustrating a method of configuring a system to present information from heterogeneous and distributed data sources data sources in accordance with another embodiment of the present invention.

FIG. 3 is a flow chart illustrating a method 300 of configuring a system to present information from heterogeneous and distributed data sources data sources in accordance with another embodiment of the present invention. At step 302 a definition of a global monitor model can be received, for example from a user or a file. The definition can indicate a plurality of low level monitor models associated with the global monitor model. At step 304, a global monitoring context can be automatically defined for the global monitor model. The global monitoring context can be a data structure that captures events to maintain a shadow image of information collected from the plurality of heterogeneous and distributed data sources. In this regard, the global monitoring context can be a summation of low level monitoring contexts associated with the low level monitor models. At step 306, a global cube can be automatically defined. The global cube can be configured to incorporate aspects of low level cubes associates with the low level monitoring contexts.

At step 308, at least one user input can be received to further configure the global cube, for example to configure the manner in which information in the global monitoring context is to be presented within a report. For example, via the global cube, at least one measure can be defined by the user. The measure can be a fact or group of facts represented by data within the information. Further, via the global cube, at least one dimension can be defined by the user to categorize the measure. The dimension can be a data category within the information.

Figure 4:
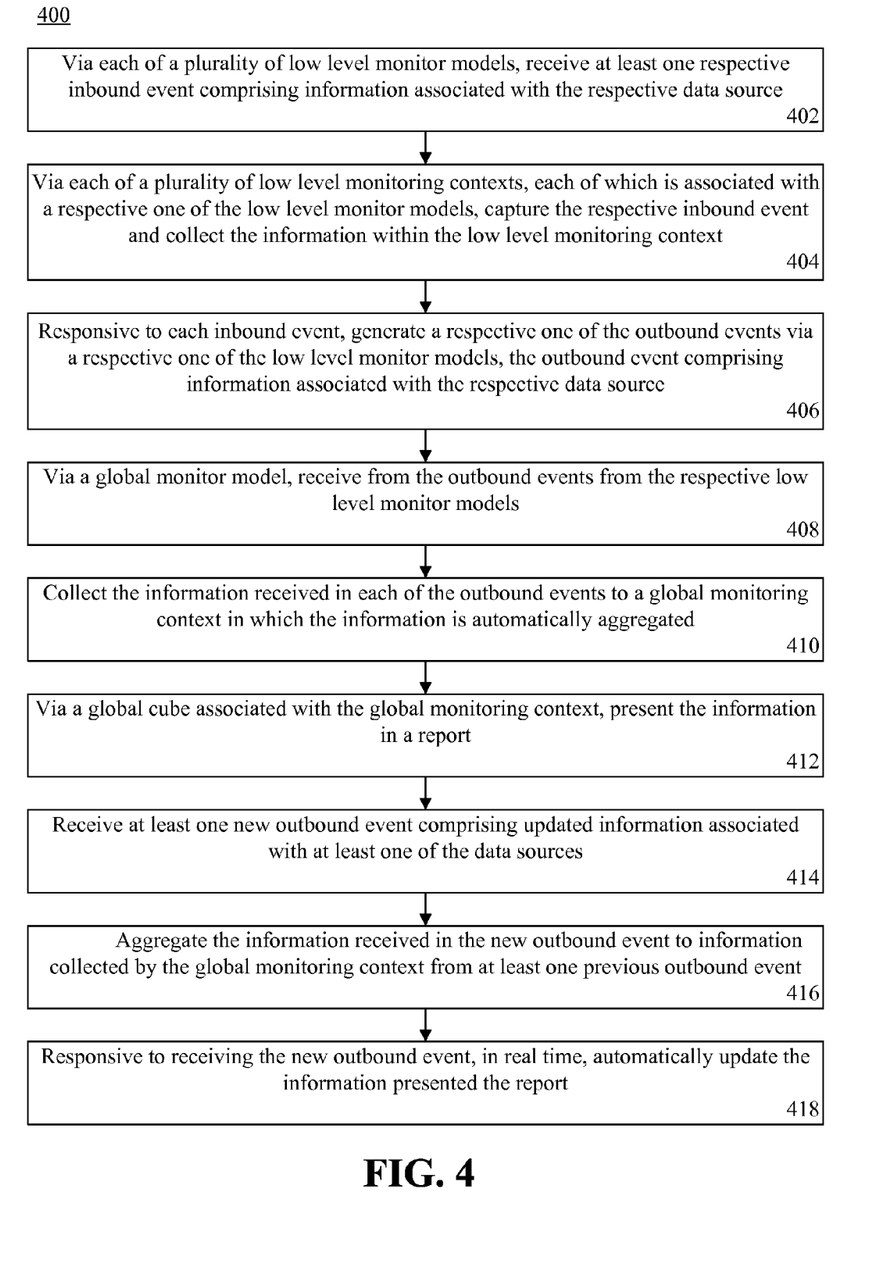
FIG. 4 is a flow chart illustrating a method of presenting information from heterogeneous and distributed data sources data sources in accordance with another embodiment of the present invention.

FIG. 4 is a flow chart illustrating a method 400 of presenting information from disparate data sources in accordance with another embodiment of the present invention. At step 402, via each of a plurality of low level monitor models, at least one respective event can be received. Each inbound event can comprise information associated with a respective data source. At step 404, via each of a plurality of low level monitoring contexts, each of which is associated with a respective one of the low level monitor models, the respective inbound event can be captured and the information can be collected within the low level monitoring context. At step 406, responsive to each respective inbound event, a respective outbound event can be generated via a respective one of the low level monitor models. Each outbound event can comprise information associated with the respective data source.

At step 408, via a global monitor model, the outbound events can be received from the respective low level monitor models. At step 410, the information received in each of the outbound events can be collected to a global monitoring context in which the information is automatically aggregated. At step 412, via a global cube associated with the global monitoring context, the information can be presented in a report.

At step 414, at least one new outbound event can be received. The new outbound event can comprise updated information associated with at least one of the data sources. At step 416, the information received in the new outbound event can be aggregated with information collected by the global monitoring context from at least one previous outbound event. At step 418, responsive to receiving the new outbound event, in real time, the information presented in the report can be automatically updated to reflect the updated information.

Figure 5:
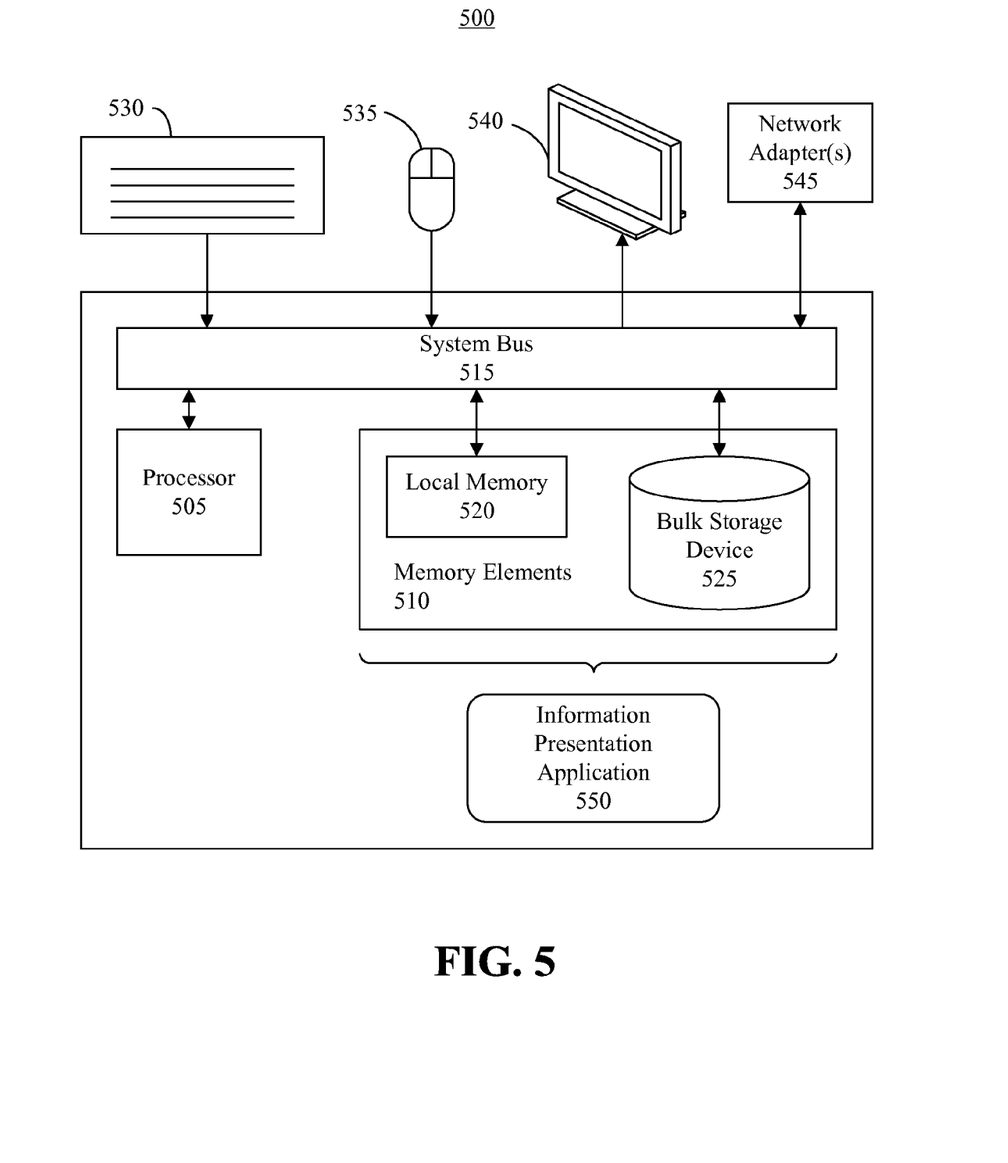
FIG. 5 is a client device in accordance with one embodiment of the present invention.

FIG. 5 is a client device 500 in accordance with one embodiment of the present invention. The client device 500 can include at least one processor 505 coupled to memory elements 510 through a system bus 515. As such, the client device 500 can store program code within the memory elements 510. The processor 505 can execute the program code accessed from the memory elements 510 via the system bus 515. In one aspect, for example, the client device 500 can be implemented as computer that is suitable for storing and/or executing program code. It should be appreciated, however, that the client device 500 can be implemented in the form of any system comprising a processor and memory that is capable of performing the functions described within this specification.

The memory elements 510 can include one or more physical memory devices such as, for example, local memory 520 and one or more bulk storage devices 525. Local memory 520 refers to random access memory or other non-persistent memory device(s) generally used during actual execution of the program code. The bulk storage device(s) 525 can be implemented as a HDD, SSD, or other persistent data storage device. The client device 500 also can include one or more cache memories (not shown) that provide temporary storage of at least some program code in order to reduce the number of times program code must be retrieved from the bulk storage device 525 during execution.

Input/output (I/O) devices such as a keyboard 530, a pointing device 535 and a display 540 optionally can be coupled to the client device 500. The I/O devices can be coupled to the client device 500 either directly or through intervening I/O controllers. One or more network adapters 545 also can be coupled to the client device 500 to enable the client device 500 to become coupled to other systems, computer systems, remote printers, and/or remote storage devices through intervening private or public networks. Modems, cable modems, and Ethernet cards are examples of different types of network adapters that can be used with the client device 500.

In one embodiment, data sources previously described can be provided by one or more other systems to which the client device 500 is communicatively linked via the network adapter(s) 545, though this need not be the case. For example, the client device 500 can be communicatively linked to the data sources via one or more ports (not shown), such as a universal serial bus (USB) port, and IEEE-1394 port, a parallel ATA port, a serial ATA (SATA) port, or the like. In another embodiment, one or more of the data sources can be stored in the memory elements 510.

As pictured in FIG. 5, memory elements 510 can store an information presentation application 550. The information presentation application 550, being implemented in the form of executable program code, can be executed by the client device 500 to implement the methods and processes described herein. In one embodiment, the information presentation application 550 can be implemented within IBM® WebSphere® Business Monitor (IBM and WebSphere are trademarks of International Business Machines Corporation in the United States, other countries, or both).

Like numbers have been used to refer to the same items throughout this specification. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of presenting information from a plurality of heterogeneous and distributed data sources, the method comprising:
   via a processor executing a global monitor model, receiving from each of a plurality of low level monitor models an outbound event comprising information associated with a respective data source;
   via the processor, collecting the information received in each of the outbound events to a global monitoring context in which the information is automatically aggregated, wherein the global monitoring context is a data structure that captures events to maintain a shadow image of information collected from the plurality of heterogeneous and distributed data sources;
   via a global cube associated with the global monitoring context, presenting the information in a report;
   receiving at least one new outbound event comprising updated information associated with at least one of the data sources; and
   responsive to receiving the new outbound event, in real time, automatically updating the information presented the report to reflect the updated information.

2. The method of claim 1, further comprising:
   aggregating the information received in the new outbound event with information collected by the global monitoring context from at least one previous outbound event.

3. The method of claim 1, further comprising:
   receiving, via each of the plurality of low level monitor models, at least one respective inbound event comprising the information associated with the respective data source;
   responsive to each inbound event, generating a respective one of the outbound events via a respective one of the low level monitor models.

4. The method of claim 3, wherein the respective inbound events are communicated to the respective low level monitor models from the respective data sources in real time in response to the information in the respective data sources being updated.

5. The method of claim 4, wherein the respective data sources being updated comprises information being added to, deleted from, or changed in the respective data sources.

6. The method of claim 3, further comprising:
   via each of a plurality of low level monitoring contexts, each of which is associated with a respective one of the low level monitor models, capturing the respective inbound event and collecting the information within the low level monitoring context.

7. The method of claim 6, further comprising:
   automatically defining the global monitoring context to be a summation of the low level monitoring contexts.

8. The method of claim 1, further comprising:
   via the global cube, defining at least one measure, wherein the measure is a fact or group of facts represented by data within the information; and
   via the global cube, defining at least one dimension to categorize the measure, wherein the dimension is a data category within the information.

9. The method of claim 1, further comprising:
   automatically configuring the global cube to incorporate at least one reporting configuration defined within a low level cube corresponding to a low level monitoring context associated with a respective one of the low level monitor models.

10. The method of claim 1, further comprising:
    presenting an object on a display of user's client device, wherein presenting the report comprises presenting the report within the object.

11. A method of configuring a system to present information from disparate data sources, the method comprising:
    receiving a definition of a global monitor model, the definition indicating a plurality of low level monitor models associated with the global monitor model;
    automatically defining a global monitoring context for the global monitor model, the global monitoring context being a summation of low level monitoring contexts associated with the low level monitor models, wherein the global monitoring context is a data structure that captures events to maintain a shadow image of information collected from the plurality of heterogeneous and distributed data sources; and
    automatically defining a global cube, the global cube configured to incorporate aspects of low level cubes associated with the low level monitoring contexts.

* * * * *